United States Patent
Soundiramourty et al.

(10) Patent No.: US 9,127,558 B2
(45) Date of Patent: Sep. 8, 2015

(54) TURBOMACHINE INCLUDING HORIZONTAL JOINT HEATING AND METHOD OF CONTROLLING TIP CLEARANCE IN A GAS TURBOMACHINE

(75) Inventors: Sendilkumaran Soundiramourty, Karnataka (IN); Srinivasa Rao Pakkala, Andhra Pradesh (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 416 days.

(21) Appl. No.: 13/564,175

(22) Filed: Aug. 1, 2012

(65) Prior Publication Data

US 2014/0033735 A1 Feb. 6, 2014

(51) Int. Cl.
| | |
|---|---|
| F01D 9/04 | (2006.01) |
| F01D 11/24 | (2006.01) |
| F01D 11/00 | (2006.01) |
| F01D 11/02 | (2006.01) |
| F01D 11/04 | (2006.01) |
| F01D 11/06 | (2006.01) |
| F04D 27/02 | (2006.01) |
| F02C 6/08 | (2006.01) |

(Continued)

(52) U.S. Cl.
CPC .............. *F01D 9/041* (2013.01); *F01D 11/005* (2013.01); *F01D 11/02* (2013.01); *F01D 11/025* (2013.01); *F01D 11/04* (2013.01); *F01D 11/06* (2013.01); *F01D 11/24* (2013.01); *F01D 25/14* (2013.01); *F02C 6/08* (2013.01); *F02C 9/18* (2013.01); *F04D 27/023* (2013.01); *F04D 27/0207* (2013.01); *F04D 27/0238* (2013.01); *F01D 25/243* (2013.01)

(58) Field of Classification Search
CPC ......... F01D 9/041; F01D 11/24; F01D 25/14; F01D 11/005; F01D 11/02; F01D 11/025; F01D 11/04; F01D 11/06; F02C 6/08; F02C 9/18; F04D 27/0207; F04D 27/023; F04D 27/0238

USPC ......... 60/782, 785, 795, 799; 415/116, 173.1, 415/173.2, 174.1
See application file for complete search history.

(56) References Cited

U.S. PATENT DOCUMENTS

| 1,058,936 A | 4/1913 | Bancel |
| 1,828,408 A | 10/1931 | Guy |

(Continued)

FOREIGN PATENT DOCUMENTS

| EP | 2455584 A1 | 5/2012 |
| JP | H06159009 A | 6/1994 |
| SU | 735810 A1 | 5/1980 |

OTHER PUBLICATIONS

PCT Search Report and Written Opinion dated Nov. 5, 2013, issued in connection with corresponding WO Patent Application No. PCT/US2013/053136.

*Primary Examiner* — Gerald L Sung
*Assistant Examiner* — Scott Walthour

(57) ABSTRACT

A gas turbomachine includes a casing having a first casing half including first and second edge portions and a second casing half including first and second edge sections. The first edge portion is configured and disposed to be joined to the first edge section to form a first horizontal joint and the second edge portion is configured and disposed to be joined to the second edge section to form a second horizontal joint. At least one of the first edge portion and the first edge section including a first fluid passage, and at least one of the second edge portion and second edge section including a second fluid passage. The first and second fluid passages are configured and disposed to guide heated fluid along respective ones of the first and second horizontal joints.

11 Claims, 2 Drawing Sheets

(51) Int. Cl.
 *F02C 9/18* (2006.01)
 *F01D 25/14* (2006.01)
 *F01D 25/24* (2006.01)

(56) References Cited

U.S. PATENT DOCUMENTS

| | | | |
|---|---|---|---|
| 3,390,830 A | 7/1968 | Kahane | |
| 5,385,013 A * | 1/1995 | Barron et al. | 60/782 |
| 5,605,437 A | 2/1997 | Meylan | |
| 6,266,954 B1 | 7/2001 | McCallum et al. | |
| 6,352,404 B1 | 3/2002 | Czachor et al. | |
| 7,837,429 B2 | 11/2010 | Zhang et al. | |
| 2001/0009643 A1 | 7/2001 | Kikuchi et al. | |
| 2009/0053035 A1 | 2/2009 | Zhang et al. | |
| 2009/0185894 A1 | 7/2009 | Kneeland et al. | |

* cited by examiner ably pointed out and distinctly claimed in the claims at
TURBOMACHINE INCLUDING HORIZONTAL JOINT HEATING AND METHOD OF CONTROLLING TIP CLEARANCE IN A GAS TURBOMACHINE

BACKGROUND OF THE INVENTION

The subject matter disclosed herein relates to the art of turbomachines and, more particularly, to a turbomachine including horizontal joint heating.

Many turbomachines include a compressor portion linked to a turbine portion through a common compressor/turbine shaft or rotor and a combustor assembly. The compressor portion guides a compressed air flow through a number of sequential stages toward the combustor assembly. In the combustor assembly, the compressed air flow mixes with a fuel to form a combustible mixture. The combustible mixture is combusted in the combustor assembly to form hot gases. The hot gases are guided to the turbine portion through a transition piece. The hot gases expand through the turbine portion rotating turbine blades to create work that is output, for example, to power a generator, a pump, or to provide power to a vehicle. In addition to providing compressed air for combustion, a portion of the compressed airflow is passed through the turbine portion for cooling purposes.

BRIEF DESCRIPTION OF THE INVENTION

According to one aspect of the exemplary embodiment, a gas turbomachine includes a casing having a first casing half including first and second edge portions and a second casing half including first and second edge sections. The first edge portion is configured and disposed to be joined to the first edge section to form a first horizontal joint and the second edge portion is configured and disposed to be joined to the second edge section to form a second horizontal joint. At least one of the first edge portion and the first edge section including a first fluid passage, and at least one of the second edge portion and second edge section including a second fluid passage. The first and second fluid passages are configured and disposed to guide heated fluid along respective ones of the first and second horizontal joints.

According to another aspect of the exemplary embodiment, a method of maintaining tip clearance in a gas turbomachine includes extracting gases from an aft portion of the gas turbomachine, introducing the gases into a casing of the gas turbomachine, guiding the gases along a horizontal joint, joining a first casing half to a second casing half, heating the horizontal joint to facilitate a substantially uniform thermal expansion of the casing to provide a desired tip clearance in the gas turbomachine, and passing the gases into a forward portion of the gas turbomachine.

According to yet another aspect of the exemplary embodiment, a gas turbomachine includes a combustor assembly, a compressor portion fluidically connected to the combustor assembly, and a turbine portion operatively connected to the compressor portion and fluidically connected to the combustor assembly. At least one of the compressor portion and the turbine portion includes a casing having a first casing half including first and second edge portions and a second casing half including first and second edge sections. The first edge portion is configured and disposed to be joined to the first edge section to form a first horizontal joint and the second edge portion is configured and disposed to be joined to the second edge section to form a second horizontal joint. At least one of the first edge portion and the first edge section including a first fluid passage, and at least one of the second edge portion and second edge section including a second fluid passage. The first and second fluid passages are configured and disposed to guide heated fluid along respective ones of the first and second horizontal joints.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
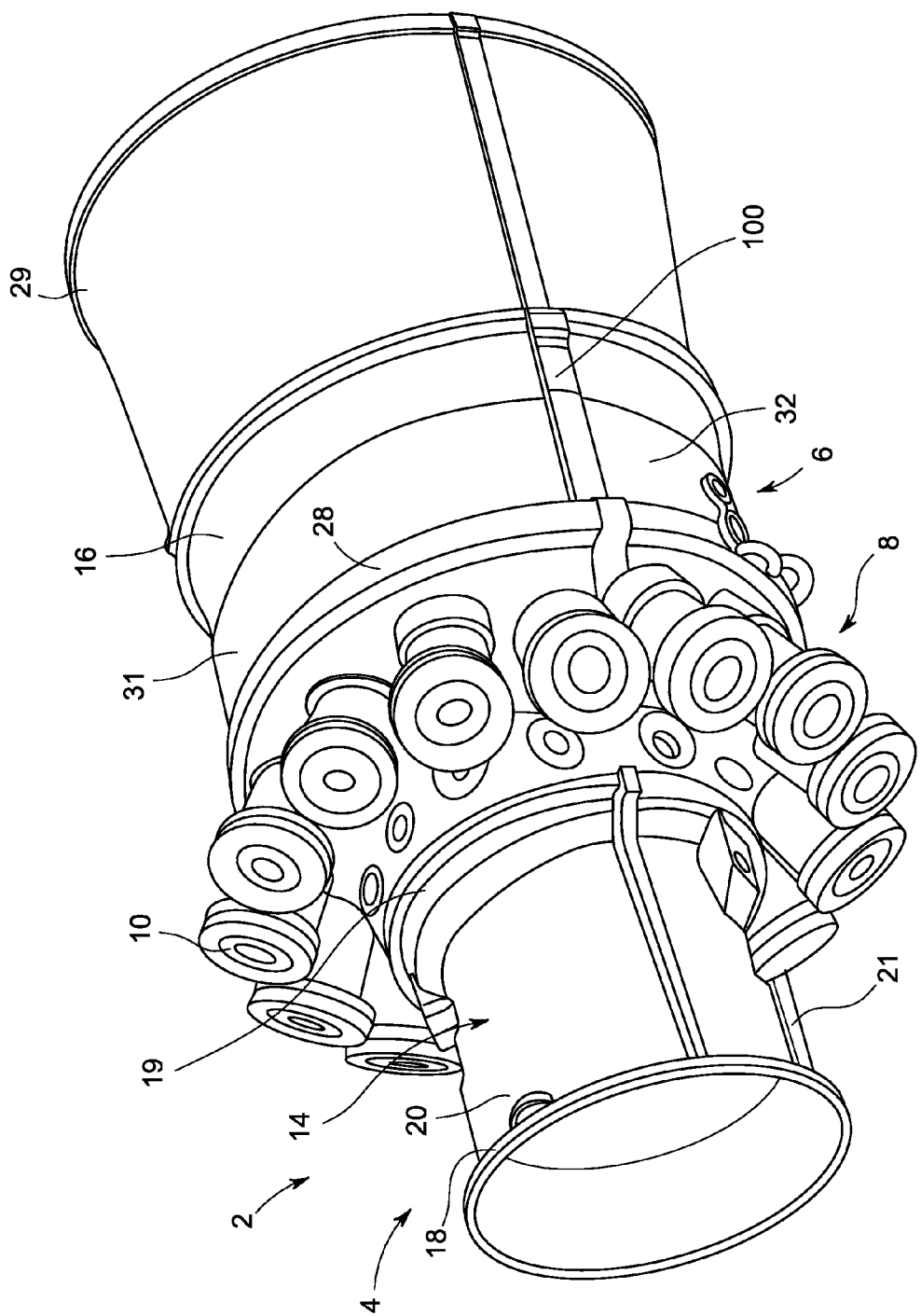
FIG. 1 is a perspective view of a gas turbomachine including horizontal joint heating in accordance with an exemplary embodiment.

A gas turbomachine in accordance with an exemplary embodiment is indicated generally at 2 in FIG. 1. Gas turbomachine 2 includes a compressor portion 4 operatively connected to a turbine portion 6. A combustor assembly 8 is fluidically connected to compressor portion 4 and turbine portion 6. Combustor assembly 8 includes a plurality of combustors, one of which is indicated at 10, arranged in a canannular array. Of course it should be understood that the number and arrangement of combustors 10 may vary. Combustor assembly 8 is fluidically connected to turbine portion 6 through a transition piece (not shown). Compressor portion 4 includes a plurality of compressor stages (not shown) housed within a compressor casing 14 and turbine portion 6 includes a plurality of turbine stages (also not shown) housed within a turbine casing 16. Compressor casing 14 includes a forward compressor section 18 and an aft compressor section 19. Compressor casing 14 also includes a first compressor casing half 20 and a second compressor casing half 21. Similarly, turbine casing 16 includes a forward turbine section 28 and an aft turbine section 29. Turbine casing 16 also includes a first turbine casing half 31 and a second turbine casing half 32.

Figure 2:
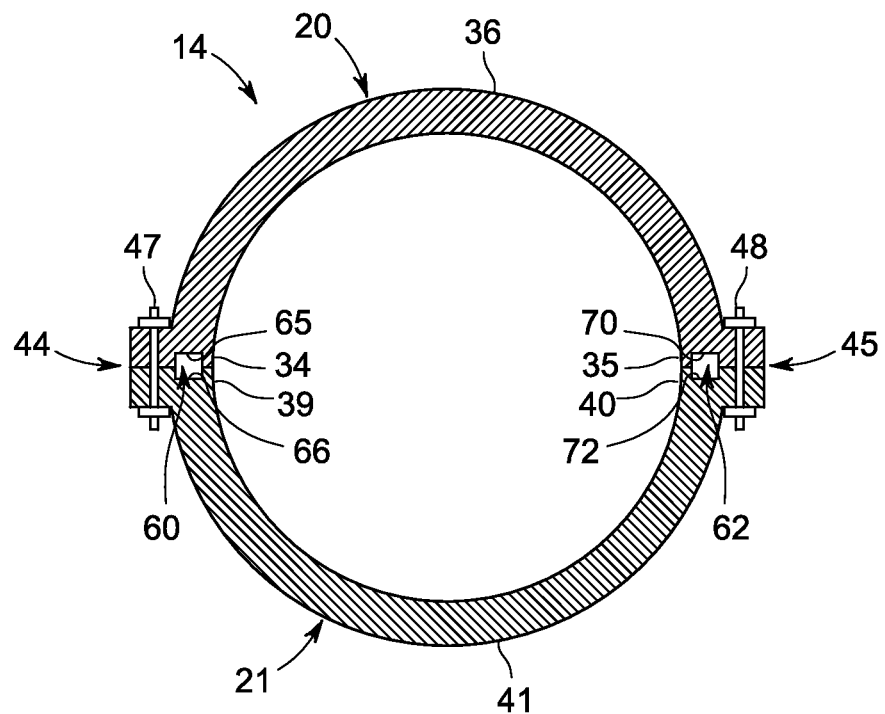
FIG. 2 is a cross-sectional end view of a gas turbomachine casing in accordance with an exemplary embodiment.

As best shown in FIG. 2, first compressor casing half 20 includes a first edge portion 34 and a second edge portion 35 joined through an intermediate portion 36. Similarly, second compressor casing half 21 includes a first edge section 39 and a second edge section 40 that are joined through an intermediate section 41. First edge portion 34 is joined to first edge section 39 to form a first horizontal joint 44 and second edge portion 35 is joined to second edge section 40 to form a second horizontal joint 45. First edge portion 34 is joined to first edge section 39 through a plurality of mechanical fasteners or bolts, one of which is shown at 47. Similarly, second edge portion 35 is joined to second edge section 40 through a plurality of mechanical fasteners or bolts, one of which is shown at 48.

In accordance with an exemplary embodiment, a first fluid passage 60 extends axially through compressor casing 14 along first horizontal joint 44 and a second fluid passage 62 extends axially through compressor casing 14 along second horizontal joint 45. First fluid passage 60 includes a first fluid passage portion 65 formed in first edge portion 34 and a second fluid passage portion 66 formed in first edge section 39. Second fluid passage 62 includes a first fluid passage section 70 formed in second edge portion 35 and a second fluid passage section 72 formed in second edge section 40. At this point it should be understood that while shown as having a generally rectangular cross-section, first and second fluid passages may possess a wide array of geometries.

Figure 3:
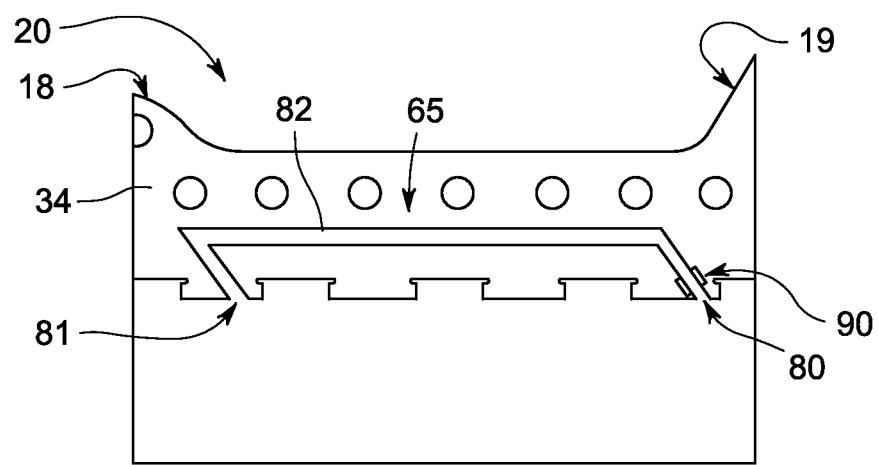
FIG. 3 is a partial plan view of an edge portion of the casing surface of FIG. 2.

As shown in FIG. 2, first fluid passage portion 65 registers with second fluid passage portion 66 to form first fluid passage 60 when first compressor casing half 20 is joined to second compressor casing half 21. Likewise, first fluid passage section 70 registers with second fluid passage section 72 to form second fluid passage 62 when first compressor casing half 20 is joined to second compressor casing half 21. As each fluid passage portion and each fluid passage section is similarly formed, a detailed description will follow to FIG. 3 in describing first fluid passage portion 65 with an understanding that second fluid passage portion 66 along with first and second fluid passage sections 70 and 71 include corresponding structure.

First fluid passage portion 65 includes an inlet portion 80 and an outlet portion 81 that are joined through an intermediate portion 82. Inlet portion 80 is fluidically connected to high pressure extraction (not separately labeled). In the case of a compressor portion, the high pressure extraction generally comprises an aft compressor extraction (also not separately labeled) and outlet portion 81 is fluidically connected to a low pressure extraction (not separately labeled). In the case of a compressor, the low pressure extraction comprises a forward compressor extraction (also not separately labeled). In this manner, hot gases from the aft compressor extraction pass into inlet portion 80 and enter intermediate portion 82 to flow along first horizontal joint 44 before passing back into the forward compressor extraction. A second, similar, flow will pass along the second horizontal joint 45. The hot gases flowing through first and second fluid passages 60 and 62 pre-heat first and second horizontal joints 44 and 45 to establish a more uniform thermal expansion of compressor casing 14. A more uniform thermal expansion of compressor casing 14 allows designers to reduce out of roundness of the casing leading to utilize tighter tip clearances that lead to a reducing in compressor losses leading to an increase in compressor efficiency. It should be understood that the number of outlets from each fluid passage 60, 62 may vary. It should also be understood that the high pressure extraction may originate externally of the gas turbomachine.

In accordance with one aspect of the exemplary embodiment, a control element 90 is arranged at inlet portion 80. Control element 90 may be a passive control element such as a shaped memory alloy (SMA) or an active control element such as an electrically controlled valve that selectively cuts off gas flow through first fluid passage 60 when compressor casing 14 reaches a uniform temperature such as during steady state operation. Of course, it should be understood that the particular position of control element 90 may vary. It should also be understood that second fluid passage 62 may also be provided with a similar control element (not shown). It should be further understood that while shown and described in connection with compressor portion 4, turbine portion 6 may also include fluid passages, such as shown at 100 in FIG. 1, extending along horizontal joints (not separately labeled) of turbine casing 16. In a turbine portion, the high pressure extraction would generally comprise a forward extraction (not separately labeled) and the low pressure extraction would comprise an aft extraction (also not separately labeled).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A gas turbomachine comprising:
   a casing having a first casing half including first and second edge portions and a second casing half including first and second edge sections, the first edge portion being configured and disposed to be joined to the first edge section to form a first horizontal joint and the second edge portion being configured and disposed to be joined to the second edge section to form a second horizontal joint, at least one of the first edge portion and the first edge section including a first fluid passage having a first longitudinal axis extending along a general length of the first horizontal joint, wherein the first horizontal joint is generally straight, and at least one of the second edge portion and second edge section including a second fluid passage having a second longitudinal axis extending along a general length of the second horizontal joint, wherein the second horizontal joint is generally straight, the first and second fluid passages being configured and disposed to guide heated fluid along respective ones of the first and second horizontal joints;
   an inlet portion fluidically connected to one of the first and second fluid passages; and
   an outlet portion fluidically connected to the one of the first and second fluid passages, at least one of the inlet portion and the outlet portion extending at a non-perpendicular angle relative to a corresponding one of the first and second longitudinal axes.

2. The gas turbomachine according to claim 1, wherein the first edge portion includes a first fluid passage portion and the first edge section includes a second fluid passage portion, the first fluid passage portion being configured and disposed to register with the second fluid passage portion to form the first fluid passage.

3. The gas turbomachine according to claim 1, wherein the second edge portion includes a first fluid passage section and the second edge section includes a second fluid passage section, the first fluid passage section being configured and disposed to register with the second fluid passage section to form the second fluid passage.

4. The gas turbomachine according to claim 1, wherein the inlet portion and the outlet portion are fluidically connected to the first fluid passage.

5. The gas turbomachine according to claim 1, wherein each of the first and second fluid passages extends between an aft portion of the casing and a forward portion of the casing.

6. The gas turbomachine according to claim 5, wherein the inlet portion is fluidically connected to the aft portion of the casing.

7. The gas turbomachine according to claim 5, wherein the outlet portion is fluidically connected to the forward portion of the casing.

8. The gas turbomachine according to claim 1, wherein the casing surrounds a compressor portion.

9. The gas turbomachine according to claim 1, further comprising: a control element arranged in corresponding ones of the first and second fluid passages, each control element being configured and disposed to selectively close the corresponding first and second fluid passage.

10. A gas turbomachine comprising:
a combustor assembly;
a compressor portion fluidically connected to the combustor assembly;
a turbine portion operatively connected to the compressor portion and fluidically connected to the combustor assembly, at least one of the compressor portion and the turbine portion including a casing having a first casing half including first and second edge portions and a second casing half including first and second edge sections, the first edge portion being configured and disposed to be joined to the first edge section to form a first horizontal joint and the second edge portion being configured and disposed to be joined to the second edge section to form a second horizontal joint, at least one of the first edge portion and the first edge section including a first fluid passage having a first longitudinal axis extending along a general length of the first horizontal joint, wherein the first horizontal joint is generally straight, and at least one of the second edge portion and second edge section including a second fluid passage having a second longitudinal axis extending along a general length of the second horizontal joint, wherein the second horizontal joint is generally straight, the first and second fluid passages being configured and disposed to guide heated fluid along respective ones of the first and second horizontal joints;
an inlet fluidically connected to one of the first and second fluid passages; and
an outlet fluidically connected to the one of the first and second fluid passages, at least one of the inlet and the outlet extending at a non-perpendicular angle relative to a corresponding one of the first and second longitudinal axes.

11. The gas turbomachine according to claim 10, wherein the first edge portion includes a first fluid passage portion and the first edge section includes a second fluid passage portion, the first fluid passage portion being configured and disposed to register with the second fluid passage portion to form the first fluid passage, and the second edge portion includes a first fluid passage section and the second edge section includes a second fluid passage section, the first fluid passage section being configured and disposed to register with the second fluid passage section to form the second fluid passage.

* * * * *